(12) United States Patent
Urata et al.

(10) Patent No.: US 6,996,411 B2
(45) Date of Patent: Feb. 7, 2006

(54) WIRELESS COMMUNICATION TERMINAL

(75) Inventors: Syoichi Urata, Fukuoka (JP); Yutaka Aoki, Fukuoka (JP); Hiroyuki Kadosono, Fukuoka (JP); Shinji Kuriyama, Fukuoka (JP); Toshitsugu Kobayashi, Fukuoka (JP); Kouji Sakata, Fukuoka (JP); Hidefumi Takaoka, Fukuoka (JP); Ryoko Tamura, Fukuoka (JP); Tadashi Nakano, Fukuoka (JP); Masaki Bansho, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 383 days.

(21) Appl. No.: 10/280,984

(22) Filed: Oct. 25, 2002

(65) Prior Publication Data

US 2003/0176178 A1 Sep. 18, 2003

(30) Foreign Application Priority Data

Mar. 18, 2002 (JP) .............................. 2002-074582

(51) Int. Cl.
*H04B 7/00* (2006.01)
*H04Q 7/20* (2006.01)
(52) U.S. Cl. ..................... 455/500; 455/11.1; 455/518
(58) Field of Classification Search ............... 455/11.1, 455/15–16, 20–23, 507, 517, 518, 550.1, 455/500, 519
See application file for complete search history.

(56) References Cited

U.S. PATENT DOCUMENTS

| | | | | |
|---|---|---|---|---|
| 3,939,417 A * | 2/1976 | Cannalte et al. ............... 455/9 |
| 5,349,694 A * | 9/1994 | Kawano et al. ............. 455/11.1 |
| 6,141,533 A * | 10/2000 | Wilson et al. .............. 455/11.1 |
| 6,185,430 B1 * | 2/2001 | Yee et al. .................... 455/519 |
| 6,404,775 B1 * | 6/2002 | Leslie et al. ................ 370/466 |
| 6,606,482 B1 * | 8/2003 | Wheeler ..................... 455/11.1 |
| 6,650,629 B1 * | 11/2003 | Takahashi et al. .......... 370/335 |
| 2001/0018328 A1 * | 8/2001 | Ohkura et al. ................ 455/15 |
| 2002/0039885 A1 * | 4/2002 | Weissman et al. ............ 455/20 |
| 2002/0045461 A1 * | 4/2002 | Bongfeldt .................... 455/522 |
| 2004/0110469 A1 * | 6/2004 | Judd et al. ..................... 455/15 |

FOREIGN PATENT DOCUMENTS

| | | |
|---|---|---|
| JP | 59-169236 | 9/1984 |
| JP | 8-31907 | 3/1991 |
| JP | 2001-148657 | 5/2001 |

* cited by examiner

Primary Examiner—Simon Nguyen
(74) Attorney, Agent, or Firm—Katten Muchin Rosenman LLP (57) ABSTRACT

A wireless communication terminal including a wireless communication unit for receiving and transmitting voice signals between terminals connected through a voice channel and a data channel, a signal input/output unit for inputting and outputting voice signals for voice communication and a mixing unit, interposed between the wireless communication unit and signal input/output unit, for performing mixing operations to create a first mixed signal to be output to said signal input/output unit and second mixed signals each to be transmitted to the corresponding terminal. The wireless communication terminal is preferably used for wireless voice communication performed by three or more terminals without being interposed by a center apparatus (such as a server) or a repeater. Further, signal-receiving/transmitting is set for each wireless communication terminal whereupon convenience can be improved.

9 Claims, 9 Drawing Sheets

WIRELESS COMMUNICATION TERMINAL

BACKGROUND OF THE INVENTION

1. Field of the Invention

The present invention relates to a wireless communication terminal preferably applied to mutual voice communication performed over a network formed by more than three communication terminals.

2. Description of the Related Art

In recent years, wireless communication terminals conforming to Bluetooth (trademark) wireless technology have been globally developed so as to realize wireless LANs (Local Area Networks). As known in the art, in Bluetooth™ wireless technology, transmitting/receiving voice signals can be performed among such wireless communication terminals without the presence of a server to function as a center apparatus, or a repeater.

When a voice conference is performed by a number of conventional wireless communication terminals included in a server (a center apparatus) or a repeater, the server or the repeater convenes the voice conference decides which wireless communication terminals are invited to the voice conference, and performs mixing operations on voice signals transmitted/received among the wireless communication terminals. On the other hand, if a voice conference is performed over the above-mentioned wireless LAN, in which more than two terminals are connected without a server or the like interposed, it is necessary to fix settings for mixing operations in relation to voice signals and for convening a voice conference in accordance with a style of the voice conference. Japanese Patent Laid-Open (Kokai) Publication No.2001-148657 discloses a communication system for wireless communication terminals (wireless communication system for vehicles).

However, the communication system of the Publication makes a repeater transmit a voice signal, which has been input from a wireless communication terminal, to another terminal whereupon the repeater is indispensable when a voice conference is performed over a number of wireless communication terminals.

Additionally, for the purpose of improving convenience of a voice communication utilizing wireless communication terminals, manners of receiving/transmitting voice signals should be set for each terminal according to voice conference style.

SUMMARY OF THE INVENTION

With the foregoing problems in view, it is a first object of the present invention to provide a wireless communication terminal operable to perform voice communication among a number of terminals without being interposed by a center apparatus, such as a server, or a repeater. It is a second object to provide a wireless communication terminal operable to determine a manner of transmitting and outputting voice signals for each of the terminals thereby improving convenience of voice communication.

To accomplish the first and the second objects, as a first generic feature, there is provided a wireless communication terminal, wirelessly and communicably connected to two or more communication terminals, for performing voice communication, comprising: a wireless communication unit for receiving voice signals from and for transmitting voice signals to the communication terminals; a signal input/output unit, communicably connected to the wireless communication unit, for inputting a voice signal from and for outputting a voice signal to outside the wireless communication terminal; a mixing unit, interposed between the wireless communication unit and the signal input/output unit, for mixing the received voice signals, which have been received from the communication terminals, in order to create the voice signal (hereinafter called "first mixed signal") that is to be outputted to the signal input/output unit, and for mixing the input voice signal with each of the received voice signals, which has been transmitted to one of the communication terminals by another of the communication terminals, in order to create each of the voice signals (hereinafter called "second mixed signals") that are to be transmitted by the wireless communication section.

As a preferable feature, the mixing unit may include: an interface for interfacing with the wireless communication unit (with respect to the received voice signals and the second mixed signals); a branch section for branching the input voice signal received from the signal input/output section; a received voice signal processor for mixing the input voice signal branched by the branch section with each of the received voice signals, which has been transmitted to one of the communication terminals by another of the communication terminals and has been received through the interface, and for branching each of the received voice signals; an input voice signal mixing section for mixing the received voice signals, each branched by the received voice signal processor, in order to create the first mixed signal, and for outputting the first mixed signal to the signal input/output unit; a memory for retaining setting information for setting the mixings performed by the received voice signal processor and the input voice signal mixing section in accordance with a desired communication mode; and a controlling section for controlling the received voice signal processor and the input voice signal mixing section in performing the mixings in accordance with the communication mode based on the setting information retained in the memory.

As another preferable feature, the communication mode may include settings for the mixings respectively performed by the received voice signal processor and the input voice signal mixer with respect to the first mixed voice signal and with respect to the second mixed signals, each to be transmitted to the corresponding communication terminal; and the controlling section may control the received voice signal processor and the input voice signal mixing section in accordance with the communication mode so that the wireless communication terminal communicates with each of the communication terminals by one state selected from (i) receiving and transmitting voice signals, (ii) only receiving a voice signal, (iii) only transmitting a voice signal, and (iv) not receiving and not transmitting voice signals.

As a further preferable feature, the controlling section may include a notification section for notifying the setting information for each of the communication terminals to the corresponding communication terminal.

As described above, on the basis of a desired communication mode set for each terminal performing voice communication, a mixing unit of the wireless communication terminal of the present invention mixes received voice signals in order to create a first mixing signal that is to be outputted to the signal input/output unit, and mixes the input voice signal with each of the received voice signals in order to create second mixed signals that are transmitted from the wireless communication section. As a result, voice communication can be performed among wireless communication terminals without being interposed by a server (a center apparatus) or a dedicated repeater. Namely, wireless voice communication can be performed by wireless communication terminals themselves. It is therefore possible to make the system for voice communication small and simple, thereby reducing the cost of the system. Further, manners of receiving/transmitting voice signals can be set for each terminal in accordance with a style of voice communication whereupon service to the operator of each wireless communication terminal is improved.

Other objects and further features of the present invention will be apparent from the following detailed description when read in conjunction with the accompanying drawings.

DESCRIPTION OF THE PREFERRED EMBODIMENTS

Various preferred embodiments of the present invention will now be described with reference to the accompanying drawings.

Figure 1:
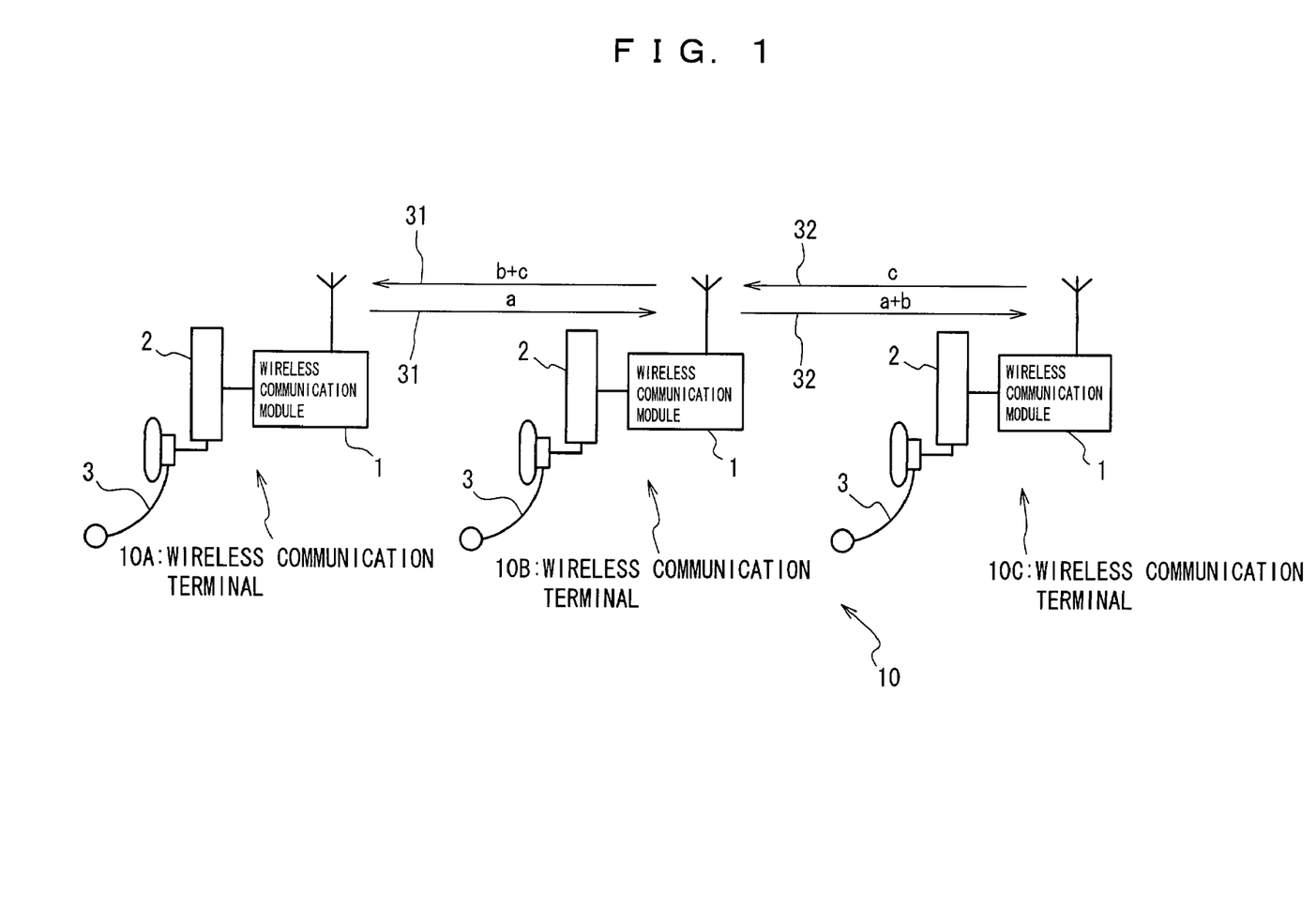
FIG. 1 is a diagram illustrating a wireless communication system in which a wireless LAN (Local Area Network) is formed by wireless communication terminals according to a first embodiment of the present invention, which terminals are connected.

(A) Configurations of a Wireless Communication Terminal and Wireless Communication System According to the First Embodiment:

FIG. 1 illustrates a wireless communication system in which a wireless LAN is formed by wireless communication terminals of the first embodiment, which terminals are connected. Wireless LAN 10 of FIG. 1 is formed by three wireless communication terminals 10A, 10B and 10C that are connected in series. Each of wireless communication terminals 10A, 10B and 10C has at least two voice channels (in the illustrated embodiment channels #0 and #1) and a data channel. The characteristic configuration of the wireless communication terminals realizes a triangular conversation (voice conference) in various predetermined styles.

Each of wireless communication terminals (hereinafter also simply called "terminals") 10a, 10b and 10c comprises wireless communication module 1, voice signal I/O unit 3 and mixing unit 2, which is a feature of the present invention.

Wireless communication module (wireless communication unit) 1 is serially connected to terminals in order to form wireless LAN 10 via at least one voice channel and a data channel in order to perform wireless communication utilizing Bluetooth™ wireless technology or the like, and also serves as a repeater to transfer a voice signal and a data signal, which are received from one terminal in wireless LAN 10, to another terminal.

Namely, wireless communication modules 1 of each terminal performs transmit and receive voice signals and data signals through the voice channels and the data channels, respectively, whereupon wireless communication terminals 10A, 10B and 10C serially connected realize wireless LAN 10. Each of wireless communication terminals 10A, 10B and 10C sets the two voice channels and the data channels using frequency hopping patterns at the bandwidth of 2.4 GHz, which channels are used to receive/transmit signals having radio frequency in wireless communication module 1.

Mixing unit 2 mixes voice signals, which are received from other terminals in wireless LAN 10, into a voice signal that is to be output from voice signal I/O unit 3 as described below, and also generates voice signals to be transmitted to another terminal via wireless communication module 1 by mixing such received voice signals with voice signals input from voice signal I/O unit 3. The specific configuration of mixing unit 2 appears in FIG. 5.

Voice signal I/O unit 3 inputs and outputs voice signals so that a user can talk with another user of another terminal in wireless LAN 10. Voice signal I/O unit 3, as shown in block diagram FIG. 5, includes signal output section 302 to reproduce the voice signal generated in mixing unit 2 mixing received signals through a non-illustrated speaker or the like, and signal input section 301 to generate an electric voice signal from voice input through a non-illustrated microphone or the like and then output the generated voice signal to mixing unit 2.

In wireless LAN 10 formed by such terminals, when a particular communication mode (later described) allows terminal 10C to receive voice signals inputted at terminals 10A and 10B, respectively, first of all terminal 10A transmits voice signal a, which has been inputted from the user (hereinafter also called operator) of terminal 10A, to terminal 10B via mixing unit 2 and wireless communication module 1. Upon receipt of voice signal a, mixing unit 2 of terminal 10B mixes voice signal a with voice signal b input from the operator of terminal 10B in order to create a mixed voice signal (a+b), which is transmitted to terminal 10C from wireless communication module 1 of terminal 10B.

At that time, assuming that terminal 10A is allowed to receive voice signals from terminals 10B and 10C in the communication mode, terminal 10C transmits voice signal c, which has been input from the operator of terminal 10C, to terminal 10B via mixing unit 2 and wireless communication module 1 of terminal 10C. Upon receipt of voice signal c, mixing unit 2 of terminal 10B mixes voice signal a with voice signal b input from the operator of terminal 10B in order to create a mixed voice signal (b+c), which is transmitted to terminal 10A from wireless communication module 1 of terminal 10B.

When a triangular conversation is performed in such a communication mode, terminal 10A outputs voice signal (b+c) input from the operators of terminals 10B and 10C to the operator, terminal 10B outputs voice signal (a+c) from terminals 10A and 10C to the operator, and terminal 10C outputs voice signal (a+b) from terminals 10A and 10B to the operator.

In the present embodiment, the configuration of each of terminals 10A, 10B and 10C enables a triangular conversation in various communication modes (i.e., receiving and transmitting of voice signals are set for each of the individual terminals). As a result, terminals 10A, 10B and 10C perform a triangular conversation (a voice conference) in various styles other than mutual communication as in the above example.

Figure 2:
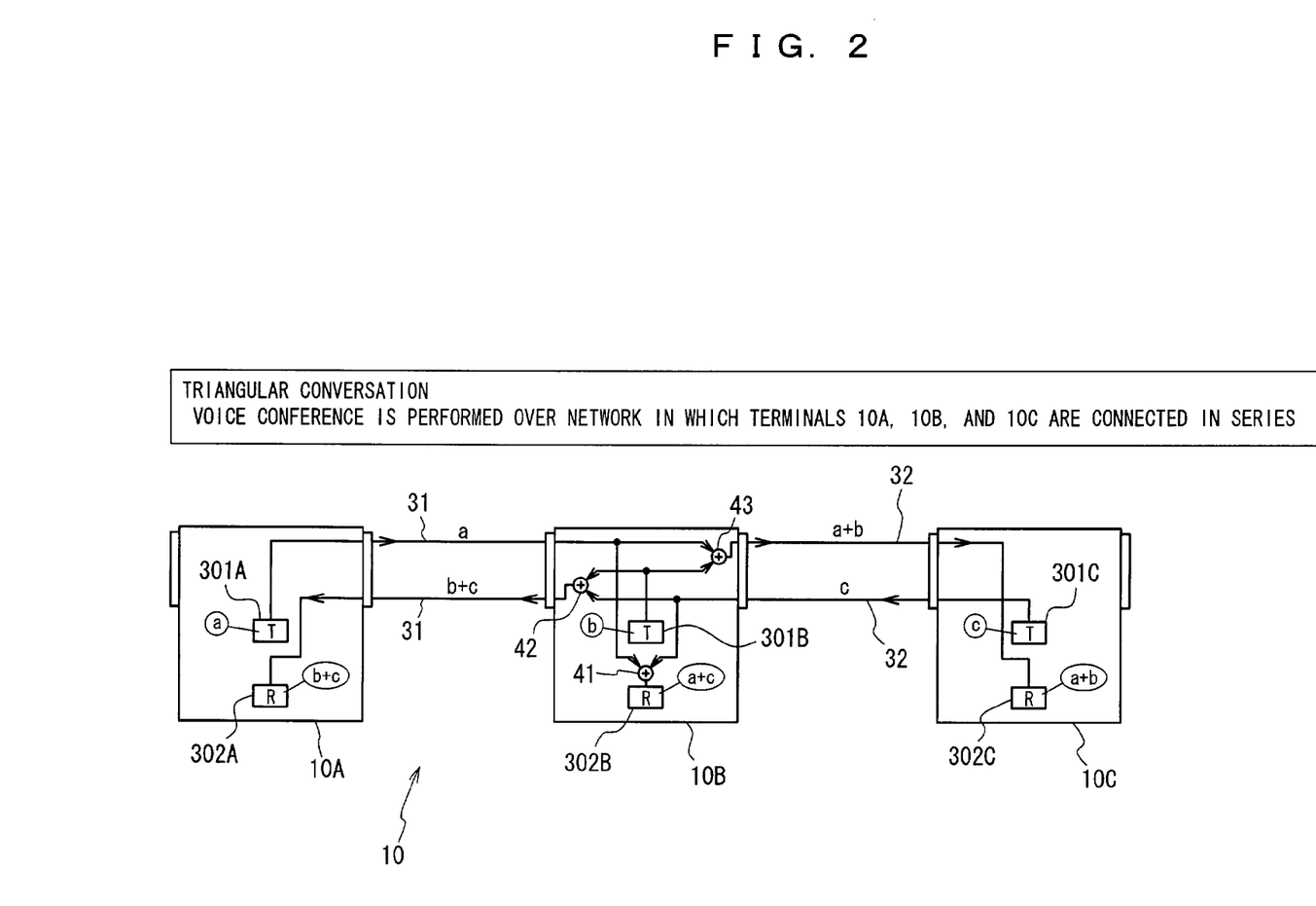
FIGS. 2 through 4 are block diagrams, each schematically showing a style of a conversation performed over the wireless LAN.
Figure 3:
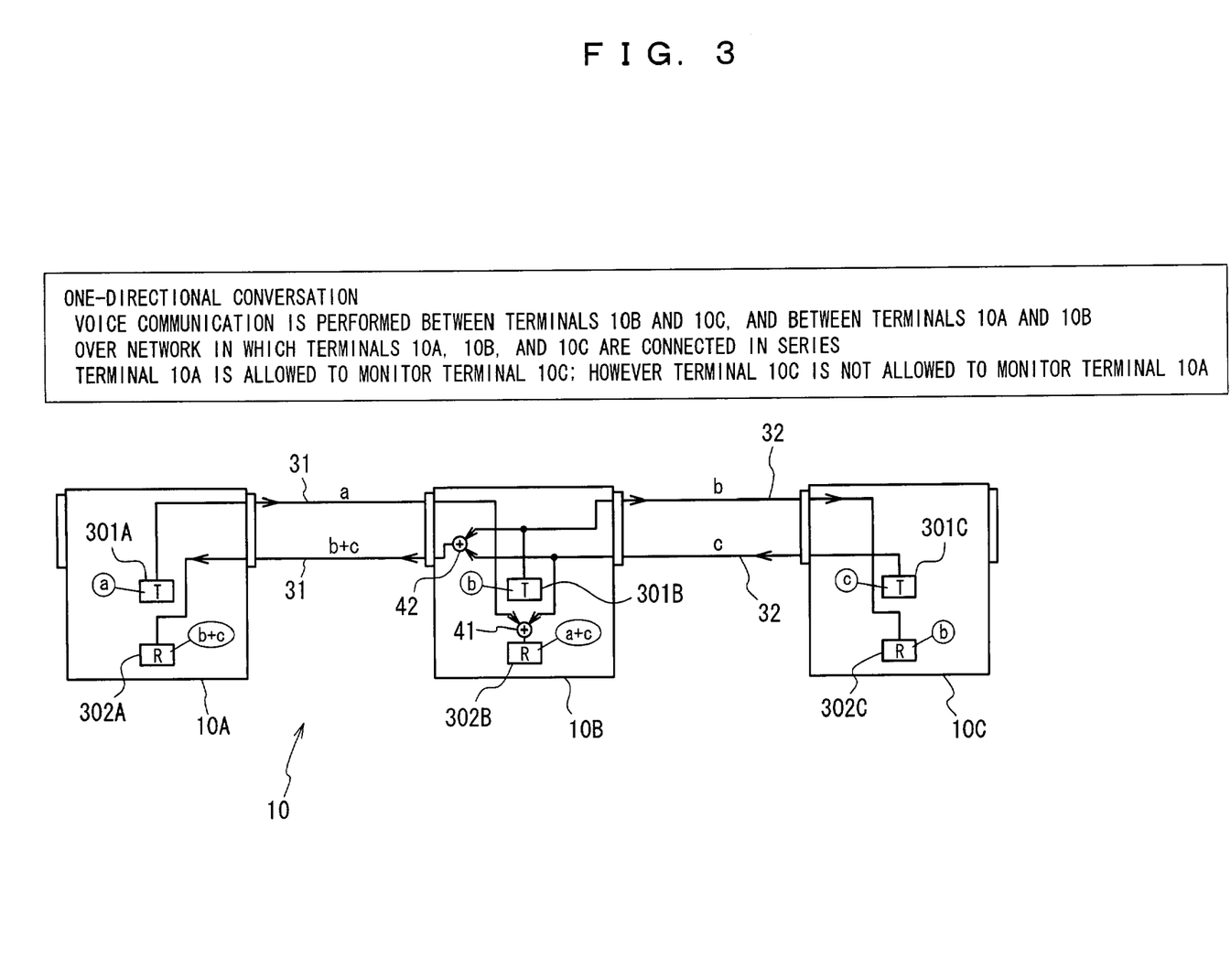
Figure 4:
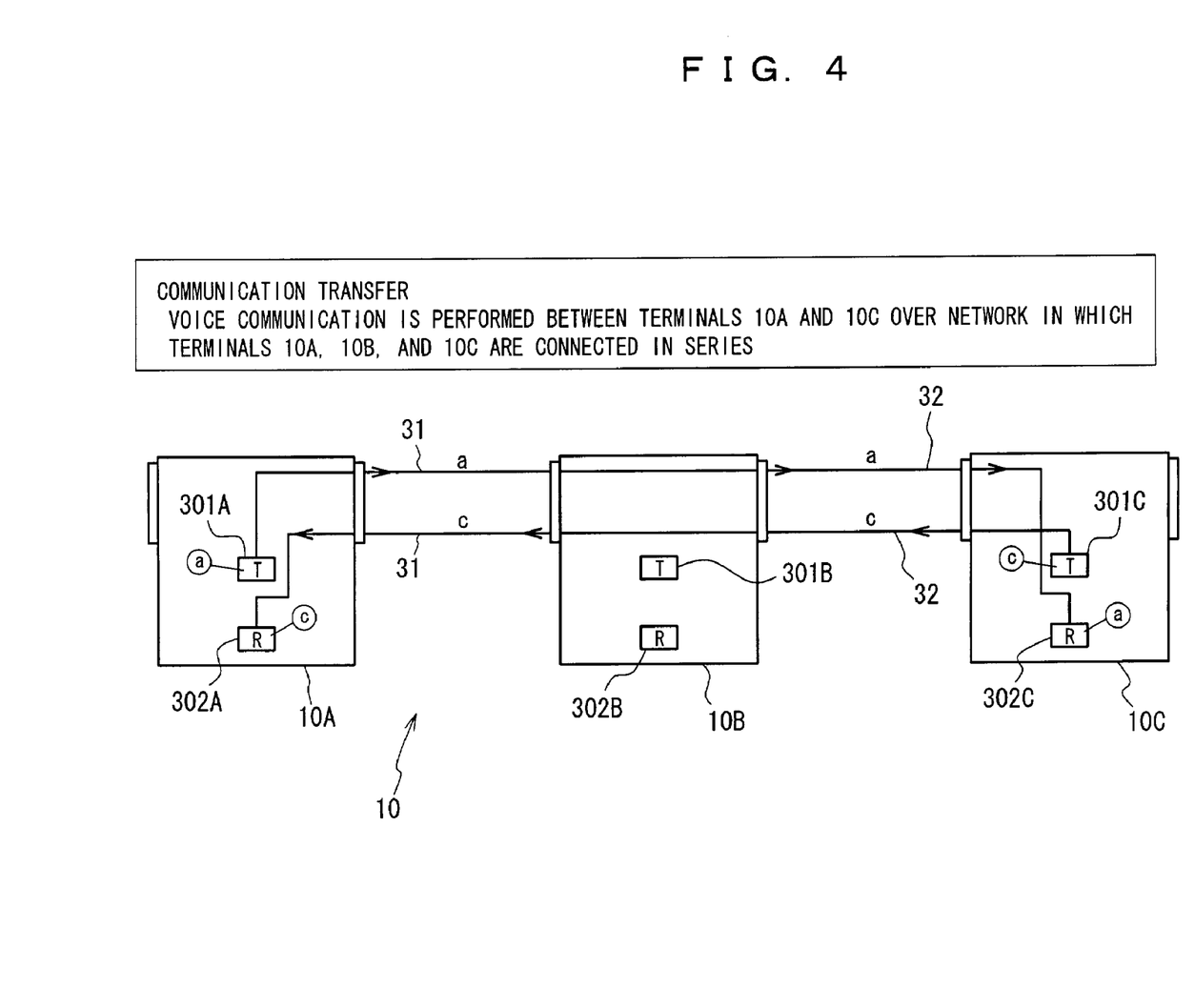

(B) Various Styles of a Triangular Conversation in the Wireless Communication System:

Various styles of a voice conference performed in wireless LAN 10 will now be described with reference to FIGS. 2 through 4. FIGS. 2 through 4 respectively show an example of a voice conference performed over the wireless LAN 10, focusing on voice signals received/transmitted terminals 10A, 10B and 10C through the voice channels.

Mixing units 2 of each of terminals 10A, 10B and 10C, which overall form wireless LAN 10, enables various styles of a voice conference as shown in FIGS. 2 through 4.

As shown in FIGS. 2 through 4, voice signal I/O units 3 of terminals 10A, 10B and 10C have voice signal I/O units 3 including signal input sections 301A, 301B and 301C, and signal output sections 302A, 302B and 302C, respectively. Terminal 10B is connected to terminal 10A through the first voice channel 31 and to terminal 10C through second voice channel 32. Likewise FIG. 1, voice signals inputted from operators of terminals 10A, 10B and 10C are respectively indicated by voice signals a, b, and c.

(B-1) First Example:

In a first example shown in FIG. 2, terminal 10A receives voice signal (b+c), which has been created by mixing voice signal b of terminal 10B with voice signal c of terminal 10C, at wireless communication module 1 through first voice channel 31 and outputs to signal output section 302A. At that time, terminal 10A transmits voice signal a, which is input from signal input section 301A, to terminal 10B through first voice channel 31.

In the similar manner, terminal 10B receives voice signal (a+c), which has been created by mixing voice signal a received from terminal 10A through first voice channel 31 with voice signal c received from terminal 10C through second voice channel 32, and outputs the mixed voice signal (a+c) to signal output section 302B. Terminal 10B also transmits voice signal (a+b), which has been created by mixing voice signal a with voice signal b input from signal input section 301B, to terminal 10C through second voice channel 32, and transmits voice signal (b+c), which has been generated by mixing voice signal c with voice signal b, to terminal 10A through first voice channel 31.

Further, terminal 10C receives voice signal (a+b) created by mixing voice signals inputted in terminals 10A and 10B, at wireless communication module 1 through second voice channel 32 and outputs the received voice signal (a+b) to signal output section 302C. At the same time, terminal 10C transmits voice signal c input from signal input section 301C to terminal 10B through second voice channel 32.

In the communication style described above, operators of terminals 10A, 10B and 10C carry out a mutual triangular conversation (transmitting/receiving voice signals) in the first example of FIG. 2. Any one operator receives voices of the other two operators and transmits his/her voice to the other two. In relation to the mechanism, terminal 10A enables reception of voice signals inputted to terminals 10B and 10C; terminal 10B enables reception of voice signals inputted to terminals 10A and 10C; and terminal 10C enables reception of voice signals inputted to terminals 10A and 10B whereupon such a mutual triangular conversation can be realized.

In FIG. 2, reference number 41 indicates a received voice signal mixing section (processor) for mixing voice signals a and c to create a mixed signal to be outputted to voice signal I/O unit 3, in which the mixed signal is outputted to the operator; reference number 42 indicates an input voice signal mixing section for mixing voice signal b input by signal input section 301B with voice signal c received from terminal 10C thereby creating voice signal (b+c) to be transmitted to terminal 10A through first voice channel 31; and reference number 43 indicates input voice signal mixing section to mix voice signal b with voice signal a received from terminal 10A thereby creating voice signal (a+b) to be transmitted to terminal 10C through second voice channel 32.

(B-2) Second Example:

In the second example shown in FIG. 3, voice-signal communication between terminals 10A and 10B is substantially identical to that of the first example, however voice-signal communication in relation to terminal 10C is different from that of the first example. Specifically, terminal 10C receives voice signal b from terminal 10B through second voice channel 32 to output voice signal b to the operator from signal output section 302C, and transmits voice signal c input from signal input section 301C to terminal 10B through second voice channel 32.

Namely, the communication style of the second example of FIG. 3, voice-signal communication is performed between terminals 10A and 10B, and between terminals 10B and 10C. In addition, terminal 10A is allowed to receive voice input from the operator of terminal 10C; however terminal 10C is not allowed to receive voice input by the operator of terminal 10A.

In FIG. 3, reference number 41 indicates a received voice signal mixing section (processor) for mixing voice signals a and c to create a mixed signal to be outputted to voice signal I/O unit 3, in which the mixed signal is outputted to the operator; and reference number 42 indicates an input voice signal mixing section for mixing voice signal b input through signal input section 301B with voice signal c received from terminal 10C thereby creating voice signal (b+c) to be transmitted to terminal 10A through first voice channel 31. Input voice signal mixing section 43 of the first example can be omitted in the illustrated example.

(B-3) Third Example:

In the third example shown in FIG. 4, terminal 10A receives voice signal c, which has been input at terminal 10C, through first voice channel 31 at wireless communication module 1 and outputs voice signal c to signal output section 302A. Terminal 10A also transmits voice signal a, which is input from signal input section 301A, to terminal 10B through first voice channel 31.

Terminal 10C receives voice signal a, which has been passed through terminal 10B and second voice channel 32 at wireless communication module 1, and further outputs voice signal a to signal output section 302C. Terminal 10C transmits voice signal c, which is input from signal input section 301C, to terminal 10B through second voice channel 32. Voice signal c is received by terminal 10B but is not output from signal output section 302B to the operator of terminal 10B.

In the triangular conversation shown in FIG. 4, terminal 10B serves to function as a repeater that repeats voice-signal communication between terminals 10A and 10C. At that time, setting directs terminal 10B not to output voice signals from terminals 10A and 10C, or not to transmit voice signals input from signal input section 301B to terminals 10A and 10C.

(C) Description of the Wireless Communication Terminal:

The detailed configuration of wireless communication terminals 10A, 10B and 10C is described with reference to FIGS. 5 and 6.

Figure 5:
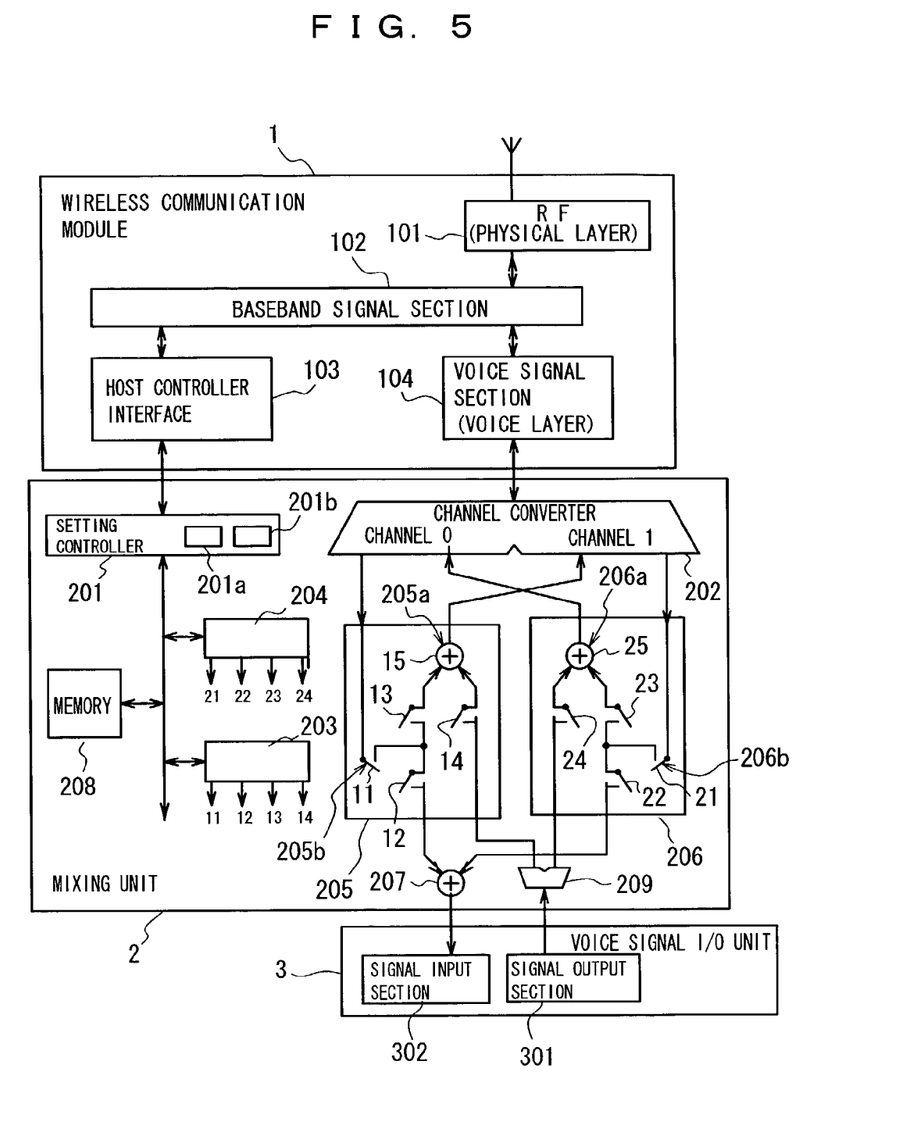
FIG. 5 is a block diagram schematically showing the individual wireless communication terminal according to the first embodiment.

For example, wireless communication module 1 comprises RF (Radio Frequency) 101 to transmit and receive radio signals between other terminals in wireless LAN 10, baseband signal section 102, host controller interface 103 and voice signal section 104, as shown in FIG. 5.

Baseband signal section (baseband layer) 102 performs a well-known baseband signal process conforming to Bluetooth™ on radio signals received in RF101, and then outputs a data signal to host controller interface 103 and a voice signal to voice signal section (voice layer) 104. On the other hand, baseband signal section 102 performs a well-known baseband signal process on a data signal from host controller interface 103, which signal is transmitted from the terminal through the data channel, and a voice signal from voice signal section 104, which signals are to be transmitted from the terminal through the voice channel (0 or 1 channel). Data and voice signal processed by baseband signal section 102 are transmitted in the form of radio signals to another terminal through RF 101 and each corresponding channel.

Mixing unit 2 comprises setting controller 201, channel converter 202, first and second switch setting sections 203 and 204, first and second processors 205 and 206, received voice signal mixer 207, memory 208 and input voice signal splitter 209. Voice signal I/O unit 3 comprises signal output section 302 to output a voice signal, as a consequence of mixing by mixing unit 2 over voice signals received from other terminals in wireless LAN 10, to the operator of the terminal in question and signal input section 301 to receive voice from the operator and output the voice to mixing unit 2 in the form of a voice signal.

Setting controller 201 receives and transmits data signals on the data channel with host controller interface 103 and controls first and second switch setting sections 203 and 204 to set a communication mode to be performed in first and second processors 205 and 206 on the basis of setting information retained in memory 208. Setting controller 201 also functions as notification section 201a and setting changer 201b.

Notification section 201a notifies setting information for first and second switch setting sections 203 and 204 of each of terminals 10A, 10B and 10C, which are wirelessly connected in series to form wireless LAN 10, of the corresponding terminal through the data channels. Setting changer 201b changes a communication mode that is controlled by settings for first and second switch setting sections 203 and 204 based on setting information notified by another terminal in wireless LAN 10.

For the purpose of the triangular conversations (voice conferences) as shown in FIGS. 2, 3 and 4, each of first and second switch setting sections 203 and 204 is controlled by setting controller 201 so as to control a switching operation performed in each of first and second processors 205 and 206.

In other words, setting controller 201 and first and second switch setting sections 203 and 204 overall serves to function as a controlling section that controls first and second processors 205 and 206 based on setting information retained in memory 208 in order to execute a triangular communication in a desired communication mode.

Channel converter 202 interfaces with wireless communication module 1 in relation to voice signals that are to be received/transmitted through the two voice channels thereby functioning as an interface. Specifically, channel converter 202 converts voice signals which are received from first and second processors 205 and 206 (later-described) and which are to be transmitted through one of the two channels into signals suitable for processing to be performed in wireless communication module 1 and outputting the converted signals to voice signal section 104 of wireless communication module 1. In addition, channel converter 202 also converts voice signals output from voice signal section 104 into signals suitable for processing to be performed in first and second processors 205 and 206.

Input voice signal splitter (branch section) 209 splits a voice signal input at signal input section 301 for two channels through which the split voice signals identical with the input voice signal flow whereupon each of first and second processors 205 and 206 receive one of the split signals respectively.

First processor 205 is in the form of an equivalent circuit including switches 11, 12, 13 and 14 and mixer 15. Second processor 206, identical in configuration to first processor 205, is in the form of an equivalent circuit including switches 21, 22, 23 and 24 and mixer 25.

First and second switch setting sections 203 and 204 set on/off-switching for each of switches 11 through 14 and 21 through 24, respectively, so that a triangular conversation is performed among terminals 10A, 10B and 10C in various communication modes exemplified by FIGS. 2, 3 and 4.

In detail, switches 11 through 14 and mixer 15 serve to function as first mixing section 205a to create a mixed signal that is to be transmitted to another terminal through second voice channel 32, one from the two voice channels. Switches 11 and 12 and mixer 15 also serve to function as first switching section 205b performing a switching operation between outputting and not outputting a voice signal that has been received through first voice channel 31, one from the two voice channels, to voice signal I/O unit 3, which outputs a voice signal for the operator.

In the same manner, switches 21 through 24 and mixer 25 serve to function as second mixing section 206a to create a mixed signal that is to be transmitted to another terminal through first voice channel 31. Switches 21 and 22 also serve to function as second switching section 206b performing a switching operation between outputting and not outputting a voice signal that has been received through second voice channel 32 to voice signal I/O unit 3.

As a result, first and second processors 205 and 206 function as a voice-signal processor to mix a voice signal, received through one of the two voice channels of channel converter 202, and a voice signal split by input voice signal splitter 209 to create a mixed signal to be transmitted to a destination terminal in wireless LAN 10 through a corresponding voice channel, and to split each of the voice signals received from other terminals through corresponding channels to output the split signal for the operator.

Received voice signal mixer 207 mixes voice signals which have been received through the two channels and which have been output from first and second processors 205 and 206 and then outputs the mixed signal to signal output section 302 of voice signal I/O unit 3.

Memory 208 previously retains setting information used for setting for mixing operations performed in first and second processors 205 and 206 in relation to mixed signals to be output to the operator or to other terminals. The setting information retained in memory 208, as shown in FIG. 6, takes the form of data for on/off switching each of switches 11 through 14 and 21 through 24 of first and second processors 205 and 206 in order to perform a triangular conversation in accordance with each of various communication modes.

Figure 6:
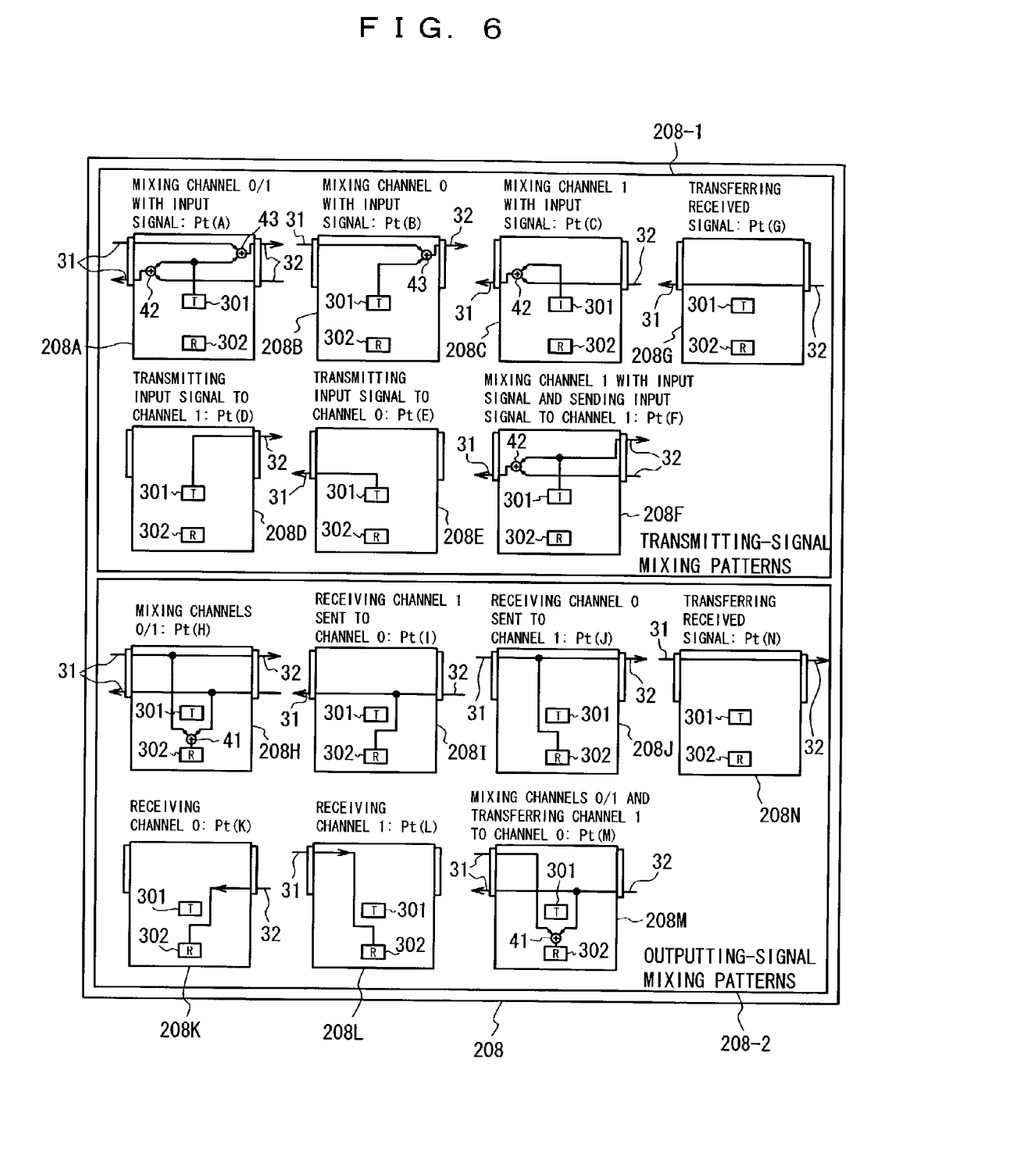
FIG. 6 is a block diagram schematically showing transmitting/outputting-signal mixing patterns used in the individual wireless communication terminal for a conversation.

Namely, memory 208 comprises transmitting-signal mixing pattern memory 208-1 for a mixing operation to create second mixed signals, each to be transmitted to another terminal in wireless LAN 10, and outputting-signal mixing pattern memory 208-2 for a mixing operation to create a first mixed signal to be output to voice signal I/O unit 3 for the operator so that setting information for first and second mixed signals are retained in separated forms, as shown in FIG. 6.

Transmitting-signal mixing pattern memory 208-1 and outputting-signal mixing pattern memory 208-2 respectively retain transmitting-signal mixing patterns and outputting-signal mixing patterns to create first and second mixed signals as shown in FIG. 6, focusing on channels through which the first and second mixed signals are transmitted or received in the same manner as FIGS. 2, 3 and 4.

In other words, transmitting-signal mixing pattern memory 208-1 and outputting-signal mixing pattern memory 208-2 respectively retains information of on/off switching of each switch in first and second processors 205 and 206 in accordance with each mixing pattern.

Specifically, transmitting-signal mixing pattern memory 208-1 retains seven mixing patterns 208A through 208G, each including on/off-switching settings for switches 11 through 14 and 21 through 24; and outputting-signal mixing pattern memory 208-2 retains seven mixing patterns 208H through 208N, each including on/off-switching settings for switches 11 through 14 and 21 through 24.

When mixing pattern 208A retained in transmitting-signal mixing pattern memory 208-1 is selected as the transmitting-signal mixing pattern in a terminal, input voice signal mixing section 42 mixes a voice signal received through second voice channel 32 with a voice signal input from signal input section 301 of the terminal in question to create a second voice signal to be transmitted through first voice channel 31, and input voice signal mixing section 43 mixes a voice signal received through first voice channel 31 with the input voice signal to create a second mixed signal to be transmitted through second voice channel 32.

At that time, on/off-switching settings corresponding to mixing pattern 208A retained in transmitting-signal mixing pattern memory 208-1 put switches 21, 23 and 24 of second processor 206 of FIG. 5 into the "on" state and also put switches 11, 13 and 14 of first processor 205 into the "on" state (by bit information of "1" or the like). Whereupon mixers 15 and 25 serve to function as input voice signal mixing sections 42 and 43 respectively when mixing pattern 208A is selected.

Mixing pattern 208B causes input voice signal mixing section 43 to mix a voice signal received through first voice channel 31 with a voice signal input in signal input section 301 of the terminal in question to create a second mixed signal that is to be transmitted through second voice channel 32.

In this case, on/off-switching setting corresponding to mixing pattern 208B retains information to put at least switches 23 and 24 into the "off" state (by bit information of "0" or the like") and switches 11, 13 and 14 into the "on" state (by bit information of "1" of the like). Mixer 15 therefore serves to function as input voice signal mixing section 43 when mixing pattern 208B is selected.

Conversely, mixing pattern 208C causes input voice signal mixing section 42 to mix a voice signal received through second voice channel 32 with a voice signal input in signal input section 301 of the terminal in question to create a second mixed signal that is to be transmitted through first voice channel 31.

At that time, on/off-switching setting corresponding to mixing pattern 208C retains information to put switches 21, 23 and 24 into the "on" state and at least switches 13 and 14 into the "off" state whereupon mixer 25 serves to function as input voice signal mixing section 42 during execution of a mixing operation in mixing pattern 208C.

Further, mixing pattern 208D transmits only a voice signal input from signal input section 301 of the terminal in question through second voice channel 32. On/off-switching setting for mixing pattern 208D causes switch 14 to become "on" and at least switches 13, 23 and 24 to become "off".

Still further, mixing pattern 208E transmits only a voice signal input from signal input section 301 of the terminal in question through first voice channel 31. On/off-switching setting for mixing pattern 208E causes switch 24 to become "on" and at least switches 13, 14 and 23 to become "off".

Mixing pattern 208F causes input voice signal mixing section 42 to mix a voice signal received through second voice channel 32 with a voice signal input by signal input section 301 of the terminal in question to create a second mixed signal that is to be transmitted through first voice channel 31, and at the same time create a second mixed signal which is identical to the input voice signal and which is to be transmitted through second voice channel 32.

In this case, on/off-switching setting for mixing pattern 208F causes switches 21, 23 and 24 of second processor 206 to become "on", switch 14 of first processor 205 to become "on" and at least switch 13 of first processor 205 to become "off". When mixing pattern 208F is selected, mixer 25 functions as input voice signal mixing section 42.

Mixing pattern 208G transfers a voice signal received through second voice channel 32 through first voice channel 31 whereupon the terminal in question serves to function as a repeater. On/off-switching setting for mixing pattern 208G causes at least switches 21 and 23 to become "on" and at least switches 13, 14 and 24 to become "off".

Mixing pattern 208H retained in outputting-signal mixing pattern memory 208-2 causes received voice signal mixing section 41 to mix voice signals received through first and second voice channels 31 and 32 in order to create a first mixed signal that is to be output to voice signal I/O unit 3, which outputs the first mixed signal to the operator of the terminal in question. Further, mixing pattern 208H also causes the terminal to transfer a voice signal received through first voice channel 31 through second voice channel 32, and transfer a voice signal received through second voice channel 32 through first voice channel 31.

On/off-switching setting for mixing pattern 208H retains information to causes switches 21, 22 and 23 of second processor 206 and switches 11, 12 and 13 of first processor 205, which are shown in FIG. 5, to become "on" whereupon received voice signal mixer 207 serves to function as received voice signal mixing section 41 when mixing pattern 208H is selected.

Mixing pattern 208I causes only a voice signal received through second voice channel 32 to be output from voice signal I/O unit 3 to the operator and further transfers a voice signal received through second voice channel 32 through first voice channel 31. On/off-switching setting for mixing pattern 208I causes switches 21, 22 and 23 to become "on" and causes at least switch 12 to become "off".

Further, when mixing pattern 208J is selected, only a voice signal received through first voice channel 31 is output to voice signal I/O unit 3 for the operator and is transferred through second voice channel 32. On/off switching corresponding to mixing pattern 208J causes switches 11, 12 and 13 to become "on" and at least switch 22 to become "off".

Mixing pattern 208K causes only a voice signal received through second voice channel 32 to be output to voice signal I/O unit 3 for the operator. On/off-switching setting for mixing pattern 208K causes switches 21 and 22 to become "on" and at least switches 12 and 23 to become "off".

Still further, mixing pattern 208L outputs only a voice signal received through first voice channel 31 to voice signal I/O unit 3 for the operator. On/off switching setting corresponding to mixing pattern 208L causes switches 11 and 12 of first processor 205 of FIG. 5 to become "on" and at least switches 13 and 22 to become "off".

When mixing pattern 208M is selected, received voice signal mixing section 41 mixes two voice signals received through first and second voice channels 31 and 32, respectively, in order to create a first mixed signal to be output to voice signal I/O unit 3, which further outputs the first mixed signal to the operator, and the voice signal received through second voice channel 32 is transferred through first voice channel 31.

At that time, on/off-switching setting for mixing pattern 208M causes switches 11, 12, 21, 22 and 23 shown in FIG. 5 to become "on" and switch 13 to become "off". Received voice signal mixer 207 therefore functions as received voice signal mixing section 41 when mixing pattern 208H is selected as an outputting-signal mixing pattern.

When mixing pattern 208N is selected, a voice signal received through first voice channel 31 is transferred through second voice channel 32. On/off switching setting for mixing pattern 208N causes switches 11 and 13 to become "on" and at least switches 12 and 22 to become "off".

When a triangular conversation shown in FIG. 2 is performed, switches 11 through 14 and 21 through 24 of first and second processors 205 and 206 of terminal 10A are controlled by first and second switch setting sections 203 and 204 in accordance with on/off switching settings corresponding to mixing patterns 208D and 208K. In the same manner, switches 11 through 14 and 21 through 24 of terminal 10B are controlled in accordance with mixing patterns 208A and 208H; and switches 11 through 14 and 21 through 24 in terminal 10C are controlled in accordance with mixing patterns 208E and 208L.

Further, when a triangular conversation shown in FIG. 3 is performed, switches 11 through 14 and 21 through 24 of first and second processors 205 and 206 of terminal 10A are controlled by first and second switch setting sections 203 and 204 in accordance with on/off switching settings corresponding to mixing patterns 208D and 208K. In the same manner, switches 11 through 14 and 21 through 24 of terminal 10B are controlled in accordance with mixing patterns 208F and 208M; and switches 11 through 14 and 21 through 24 in terminal 10C are controlled in accordance with mixing patterns 208E and 208L.

Still further, when a triangular conversation shown in FIG. 4 is performed, switches 11 through 14 and 21 through 24 of first and second processors 205 and 206 of terminal 10A are controlled by first and second switch setting sections 203 and 204 in accordance with on/off-switching settings corresponding to mixing patterns 208D and 208K. In the same manner, switches 11 through 14 and 21 through 24 of terminal 10B are controlled in accordance with mixing patterns 208G and 208N; and switches 11 through 14 and 21 through 24 in terminal 10C are controlled in accordance with mixing patterns 208E and 208L.

Setting controller 201 and first and second switch setting sections 203 and 204, serving as the controlling section, control signal transmitting/receiving through each voice channel in order to set an appropriate communication mode. It is therefore possible to set a communication mode for each terminal in wireless LAN 10, in which a plurality of terminals (three terminals in the first embodiment) are wirelessly connected in series, which communication mode is one state selected from (i) receiving and transmitting voice signals, (ii) only receiving a voice signal, (iii) only transmitting a voice signal, and (iv) not receiving and not transmitting voice signals.

Figure 7:
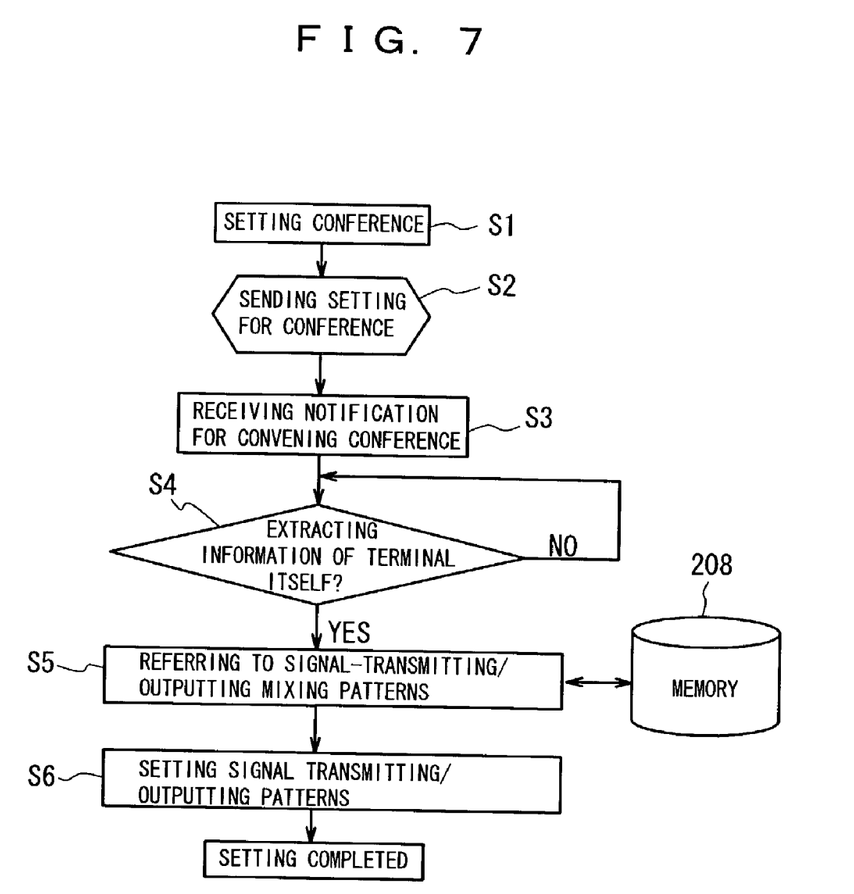
FIG. 7 is a flow diagram illustrating a succession of procedural steps of convening a voice conference performed over the wireless LAN.

(D) Manner of Convening a Voice Conference in the First Embodiment:

When one terminal in wireless LAN 10 of the first embodiment notifies convening of a voice conference to other terminals in wireless LAN 10, data communication is performed through the data channel as shown in flow diagram FIG. 7 (steps S1 through S6).

Figure 8:
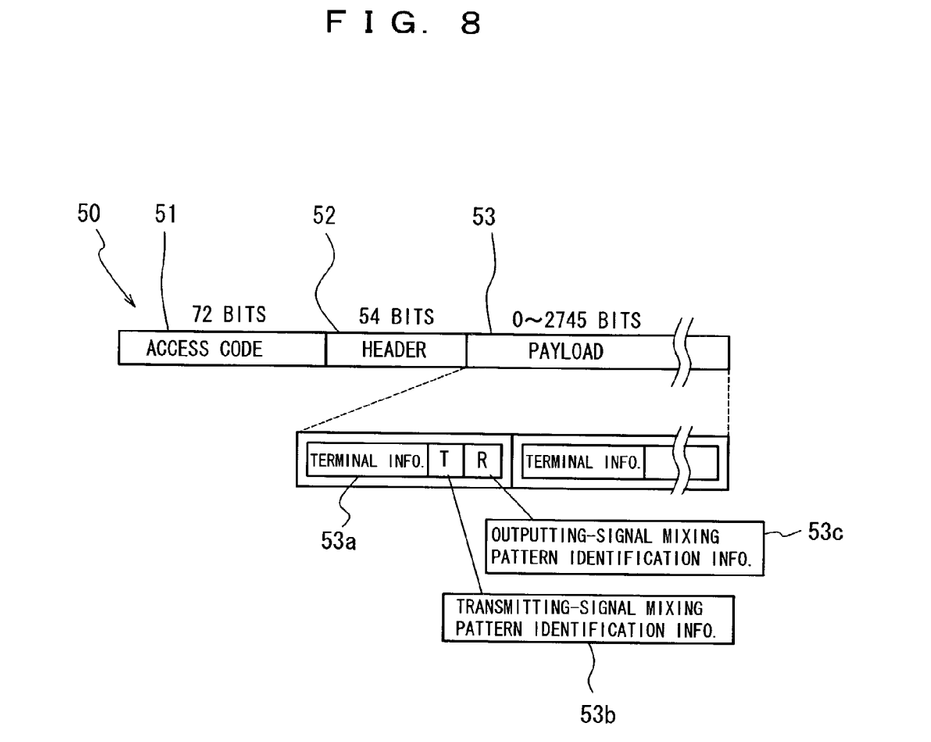
FIG. 8 is a diagram showing conference setting information that is to be sent to wireless communication terminals when convening for a voice conference.

When one terminal (for example, terminal 10A) convenes a voice conference, the terminal causes setting controller 201 to create conversation setting information 50 as shown in FIG. 8 (step S1), and notification section 201a of setting controller 201 transmits the created conversation setting information 50 to other terminals in wireless LAN 10 via the data channel (step S2).

Conversation setting information 50 to be transmitted by notification section 201a takes the form of 72-bit access code 51, 54-bit header 52, and payload 53 having a variable length between 0 through 2745 bits. Payload 53 is formed by sets of terminal information 53a including identification (ID) of a terminal and information whether or not the terminal is invited to the voice conference, transmitting-signal (mixing) pattern identification information 53b and outputting-signal (mixing) pattern identification information 53c corresponding to a communication mode of the voice conference, each set for each terminal in wireless LAN 10.

Conversation setting information 50 transmitted from the terminal that convenes the voice conference is received at RF 101 of wireless communication module 1 of each terminal that (step S3). After that, the received conversation setting information 50 is extracted in baseband signal section 102 and then output to setting controller 201 of mixing unit 2 through host controller interface 103.

Upon receipt of conversation setting information 50, each of the other terminals 10B and 10C extracts terminal information 53a (terminal ID and information whether or not the terminal is invited to the voice conference) and transmitting-/outputting-signal mixing pattern identification information 53b and 53c corresponding to the terminal at setting controller 201 (step S3).

If a terminal is invited, setting controller 201 of the terminal refers to memory 208 based on transmitting-/outputting-signal mixing pattern identification information 53b and 53c, which has been set for the terminal, and extracts transmitting-/outputting-signal mixing patterns in order to set a communication mode.

After that, when first and second switch setting sections 203 and 204 receive instructions from setting controller 201, first and second switch setting sections 203 and 204 control first and second processors 205 and 206, respectively, such that the terminal performs a conversation of the voice conference in the desired communication mode. If a terminal in wireless LAN 10 is not invited to the voice conference, the terminal sets itself to serve as a repeater that transfers a voice signal to be transmitted to or received by other terminals in wireless LAN 10 (hereinbefore Yes route in step S4 to step S5 and step S6).

Upon completion of setting for the desired communication mode in the individual terminals in wireless LAN 10, the voice conference can be started. The settings are canceled when the voice conference is over.

Further, if notification section 201a of setting controller 201 of a terminal, which is participating in the voice conference and which is serially connected to terminals in wireless LAN 10, notifies setting information to other terminals through the data channel even during the voice conference, the other terminals, which have received the setting information, cause setting changer 201b therein to change the communication mode in accordance with the received setting information.

Transmitting-/outputting-signal mixing pattern identification information 53b and 53c included in conversation setting information 50 may be in the form of transmitting/outputting-signal mixing patterns.

Special authority may be granted to a terminal that is allowed to convene a voice conference and/or to change a communication mode during a voice conference. Namely, it is possible to prohibit a terminal without such authority from convening a voice conference or changing a communication mode. Alternatively, it is possible to grant authority to change and set a voice conference in one or more particular communication modes.

(E) Result of the Invention:

As described above, in a wireless communication terminal of the first embodiment, mixing unit 2 performs mixing operations in order to create a first mixed signal to be output from voice signal I/O unit 3 for the operator and a second mixed signal to be transmitted to another terminal through wireless communication module 1 on the basis of a communication mode predetermined among terminals serially connected. As a result, since the present invention enables a voice conference among wireless communication terminals without a server (center apparatus) and a dedicated repeater, the voice conference is carried out in a small and simple system, thereby reducing the cost of the system.

If a terminal forming wireless LAN 10 does not participate in a voice conference, the communication mode for the terminal is successfully set by making transmitting-/outputting-signal mixing patterns 208G and 208N (transferring patterns; FIG. 6). It is therefore possible to select particular terminals that are to participate in a voice conference from a number of terminals communicating via the same frequency band. Further, it is possible to set a communication mode for each of the terminals participating in a voice conference in accordance with the style of the voice conference thereby improving the advantage of such a voice conference.

A combination of one of transmitting-signal mixing patterns 208A through 208G (see FIG. 6) retained in transmitting-signal mixing pattern memory 208-1 and one of outputting-signal mixing patterns 208H through 208N (see FIG. 6) in outputting-signal mixing pattern memory 208-2 allows each terminal in wireless LAN 10 to perform two-directional conversation for a voice conference or the like and one-directional conversation and to function as a repeater, thereby improving service to users.

Figure 9:
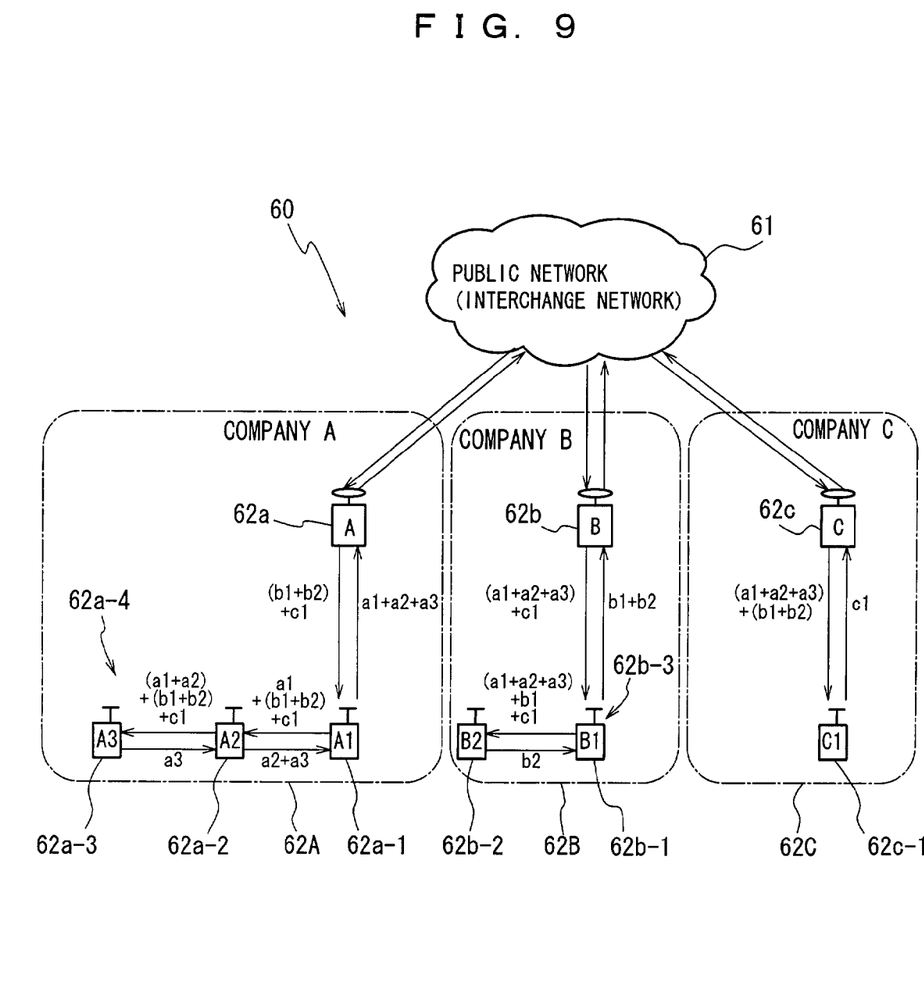
FIG. 9 is a block diagram schematically showing a wireless communication system according to a second embodiment.

(F) Second Embodiment:

FIG. 9 schematically shows a wireless communication system according to a second embodiment. Wireless communication system 60 of FIG. 9 is formed by wireless networks 62A, 62B and 62C, which are communicably connected via a public network (or an interchange network) 61. Wireless networks 62A, 62B and 62C respectively include wireless stations 62a, 62b and 62c. Wireless networks 62A, 62B and 62C further include wireless communication terminal 62a-1, 62b-1 and 62c-1, respectively.

Wireless communication terminals 62a-1, 62a-2 and 62a-3 are serially connected conforming to Bluetooth™ wireless technology thereby forming wireless LAN 62a-4 substantially identical to wireless LAN 10 of FIG. 1. In the same way, wireless communication terminals 62b-1 and 62b-2 form wireless LAN 62b-3 substantially identical to wireless LAN 10 of FIG. 1.

Each of wireless communication terminals 62a-1 to 62a-3, 62b-1 and 62b-2 that form wireless LANs 62a-4 and 62b-3, includes wireless communication module 1, mixing unit 2 and voice signal I/O unit 3 identical to the wireless communication terminal of FIG. 5. The presence of mixing unit 2 in each wireless communication terminal realizes the creation of a mixed voice signal to be output to voice signal I/O unit 3 and the creation of mixed signals to be transmitted to other wireless communication terminals via wireless communication module 1 therein in accordance with a communication mode.

Wireless communication terminal 62a-1 included in wireless station 62a mixes voice signal (a2+a3), as the consequence of mixing voice signals input in other terminals 62a-2 and 62a-3 in wireless LAN 62a-4, with voice signal a1 input in communication terminal 62a-1 itself to create mixed voice signal (a1+a2+a3). After that, wireless communication terminal 62a-1 transmits the mixed voice signal (a1+a2+a3) to other networks 62B and 62C through wireless station 62a and public network 61.

In the same way, wireless communication terminal 62b-1 included in wireless station 62b mixes voice signal b2, which has been input in the other wireless communication terminal 62b-2 in wireless LAN 62b-3, with voice signal b1 input in communication terminal 62b-1 itself to create mixed voice signal (b1+b2). After that, wireless communication terminal 62b-1 transmits the mixed voice signal (b1+b2) to other networks 62A and 62C through wireless station 62a and public network 61.

Wireless communication terminals 62a-1 to 62c-1 included in wireless stations 62a through 62c can perform communication among more than two terminals by utilizing a conventional triangular conversation service known in the art.

Wireless communication terminal 62a-1 forming wireless LAN 62a-4 receives voice signal ((b1+b2)+c1), as the consequence of mixed voice signals (b1+b2) and c1 transmitted respectively by wireless communication terminals 62b-1 and 62c-1 included in other wireless communication networks 62B and 62C, and then outputs the mixed voice signal ((b1+b2)+c1) for the operator.

Further, wireless communication terminal 62a-2 receives voice signal (a1+(b1+b2)+c1), which is created by mixing voice signal a1 input in wireless communication terminal 62a-1 with the above voice signal ((b1+b2)+c1), and outputs the mixed signal to the operator. Wireless communication terminal 62a-3 receives voice signal ((a1+a2)+(b1+b2)+c1), which is created by mixing voice signals which wireless communication terminal 62a-2 received from wireless communication terminal 62a-1 with voice signal a2 input at the wireless communication terminal 62a-2. Then, wireless communication terminal 62a-3 outputs the mixed voice signal ((a1+a2)+(b1+b2)+c1) to the operator.

Wireless communication terminal 62b-1 forming wireless LAN 62b-3 receives and outputs voice signal ((a1+a2+a3)+c1) transmitted from public network 61, which signal is a result of mixing of voice signals transmitted from other wireless networks 62A and 62C. Wireless communication terminal 62b-2 receives and outputs voice signal ((a1+a2+a3)+b1+c1), which is created by mixing the above-mentioned voice signal ((a1+a2+a3)+c1) with voice signal b1 transmitted from wireless communication terminal 62*b*-1.

Further, wireless communication terminal 62*c*-1 that is a part of wireless LAN 62*c* receives and outputs voice signal ((a1+a2+a3)+(b1+b2)) that is the result of mixing of voice signals transmitted from wireless communication terminals 62*a*-1 and 62*b*-1 respectively in wireless communication network 62A and 62B.

A voice conference can be performed in wireless communication system 60 of FIG. 9 in the same manner as steps S1 through S6 shown in flow diagram FIG. 7. When a communication terminal convenes a voice conference to another wireless LAN mutually connected via public network 61, conference setting information is first of all transmitted to one or more wireless communication terminals 61*a*-1 to 61*c*-1 in the same LAN as the communication terminal that convenes a voice conference and then is spread over the wireless communication network 60. Conference setting information is created by incorporating data to invite other LANs to a voice conference in payload 53 of conversation setting information 50.

The second embodiment therefore guarantees the same advantageous result as the first embodiment described in index (E). Additionally, a voice conference (a triangular conversation) can be performed over a number of wireless LANs whereupon it is possible to extend the advantageous function for a voice communication performed over a wireless LAN. As a result, the service to users (operators) of each wireless communication terminal is improved.

(G) Others:

Mixing unit 2 of each of terminals 10A, 10B and 10C shown in FIG. 5 may be realized by all-in-one hardware exemplified by an ASIC (Application Specific Integrated Circuit). Setting controller 201 and first and second switch setting sections 203 and 204 may be in the form of separated units or an all-in-one unit.

As an alternative, setting controller 201 may be realized by a processor that executes a program stored in memory 208.

In the first embodiment, wireless LAN 10 includes three terminals 10A, 10B and 10C connected in series. The present invention should by no means be limited to a wireless LAN having three terminals. Alternatively, four or more terminals serially connected may constitute wireless LAN 10.

Each of terminals 10A, 10B and 10C comprises two voice channels and a data channel in the first embodiment. The number and the kind of channels should by no means be limited to this. A terminal having three or more voice channels may be applied to the present invention by utilizing two of the voice channels.

Further, the present invention should by no means be limited to these foregoing embodiments, and various changes or modifications may be suggested without departing from the gist of the invention.

What is claimed is:

1. A wireless communication terminal, wirelessly and communicably connected to two or more communication terminals, for performing voice communication, comprising:
    a wireless communication unit for receiving voice signals from and for transmitting voice signals to the communication terminals;
    a signal input/output unit, communicably connected to said wireless communication unit, for inputting an incoming user voice signal from and for outputting an outgoing user voice signal to outside said wireless communication terminal;
    a mixing unit, interposed between said wireless communication unit and said signal input/output unit, for merging said received voice signals, which have been received from the communication terminals, in order to create said outgoing user voice signal, hereinafter, "first mixed signal", that is to be outputted to said signal input/output unit, and for adding said incoming user voice signal to each of said received voice signals, which has been transmitted to one of the communication terminals by another of the communication terminals, in order to create each of transmitting voice signals, hereinafter, "second mixed signals", that are to be transmitted to the communication terminals by said wireless communication section.

2. A wireless communication terminal according to claim 1, said mixing unit including:
    an interface for interfacing with said wireless communication unit with respect to said received voice signals and said second mixed signals;
    a branch section for branching said input voice signal received from said signal input/output section;
    a received voice signal processor for mixing said input voice signal branched by said branch section with each of said received voice signals, which has been transmitted to one of the communication terminals by another of the communication terminals and has been received through said interface, and for branching each said received voice signal;
    an input voice signal mixing section for mixing said received voice signals, each branched by said received voice signal processor, in order to create said first mixed signal, and for outputting said first mixed signal to said signal input/output unit;
    a memory for retaining setting information for setting the mixings performed by said received voice signal processor and said input voice signal mixing section in accordance with a desired communication mode; and
    a controlling section for controlling said received voice signal processor and said input voice signal mixing section in performing the mixings in accordance with said communication mode based on said setting information retained in said memory.

3. A wireless communication terminal according to claim 2, wherein:
    said communication mode includes settings for the mixings respectively performed by said received voice signal processor and said input voice signal mixer with respect to said first mixed voice signal and with respect to said second mixed signals, each to be transmitted to the corresponding communication terminal; and
    said controlling section controls said received voice signal processor and said input voice signal mixing section in accordance with said communication mode so that said wireless communication terminal communicates with each of the communication terminals by one state selected from (i) receiving and transmitting voice signals, (ii) only receiving a voice signal, (iii) only transmitting a voice signal, and (iv) not receiving and not transmitting voice signals.

4. A wireless communication terminal according to claim 2, wherein said controlling section includes a notification section for notifying said setting information for each of the communication terminals to the corresponding communication terminal.

5. A wireless communication terminal according to claim 2, wherein said controlling section includes a setting changer for changing said communication mode in accordance with setting information notified by one of the communication terminals.

6. A wireless communication terminal according to claim 2, wherein said received voice signal processor includes:
a first processor including
  a first mixing section for mixing said input voice signal branched by said by branch section with said received voice signal which has been received from a first communication terminal to create said second mixed signal destined for a second communication terminal based on the controlling of said controlling section in accordance with the setting information, the first and the second communication terminals being two of the communication terminals and
  a first switching section for switching between outputting and not outputting said last-named received voice signal to said signal input/output section based on the controlling of said controlling section in accordance with the setting information; and a second processor including
  a second mixing section for mixing said input voice signal branched by said by branch section with said received voice signal which has been received from the second communication terminal to create said second mixed signal destined for the first communication terminal based on the controlling of said controlling section in accordance with the setting information, and
  a second switching section for switching between outputting and not outputting said last-named received voice signal to said signal input/output section based on the controlling of said controlling section in accordance with the setting information.

7. A wireless communication terminal according to claim 6, wherein:
said first mixing section in said first processor includes
  a first input voice signal switch for switching between outputting and not outputting said input voice signal branched by said branch section to the second communication terminal based on the controlling of said controlling section in accordance with the setting information,
  a first received voice signal switch for switching between outputting and not outputting said received voice signal, which has been received from the first communication terminal, to the second terminal based on the controlling of said controlling section in accordance with the setting information, and
  a first mixer for mixing the result of the switching of said first input voice signal switch with that of said first received voice signal switch based on the controlling of said controlling section in accordance with the setting information in order to create said second mixed signal destined for the second communication terminal; and
said second mixing section in said second processor includes
  a second input voice signal switch for switching between outputting and not outputting said input voice signal branched by said branch section to the first terminal based on the controlling of said controlling section in accordance with the setting information,
  a second received voice signal switch for switching between outputting and not outputting said received voice signal, which has been received from the second communication terminal, to the first terminal based on the controlling of said controlling section in accordance with the setting information, and
  a second mixer for mixing the results of switching of said second input voice signal switch with that of said second received voice signal switch based on the controlling of said controlling section in accordance with the setting information in order to create said second mixed signal destined for the first communication terminal.

8. A wireless communication terminal according to claim 7, said controlling section including:
  a first switching setting section for setting the switchings that are to be performed in said first processor;
  a second switching setting section for setting the switchings that are to be performed in said second processor; and
  a setting controller for controlling said first and said second processor in accordance with the settings of said first and said second switching setting sections.

9. A wireless communication terminal according to claim 6, said controlling section including:
  a first switching setting section for setting the switching that is to be performed in said first processor;
  a second switching setting section for setting the switching that is to be performed in said second processor; and
  a setting controller for controlling said first and said second processor in accordance with the settings of said first and said second switching setting sections.

* * * * *